A. C. STILES.
Corn Planter

No. 1,808, 32,812.

Patented July 9, 1861.

Witnesses:
J. W. Coombs
R. S. Spencer

Inventor:
A. C. Stiles
per Munn & Co
att'ys

UNITED STATES PATENT OFFICE.

A. C. STILES, OF BUNKER HILL, WISCONSIN, ASSIGNOR TO HIMSELF AND AMOS EWBANKS, OF SAME PLACE.

IMPROVEMENT IN SEEDING-MACHINES.

Specification forming part of Letters Patent No. 32,812, dated July 9, 1861.

*To all whom it may concern:*

Be it known that I, A. C. STILES, of Bunker Hill, in the county of Grant and State of Wisconsin, have invented a new and Improved Seeding-Machine; and I do hereby declare that the following is a full, clear, and exact description of the same, reference being had to the annexed drawings, making a part of this specification, in which—

Figure 1:
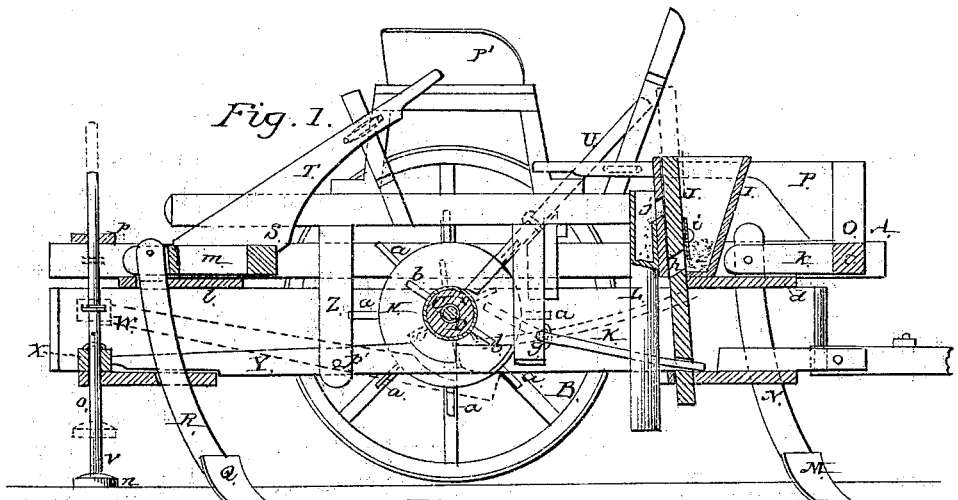
Figure 2:
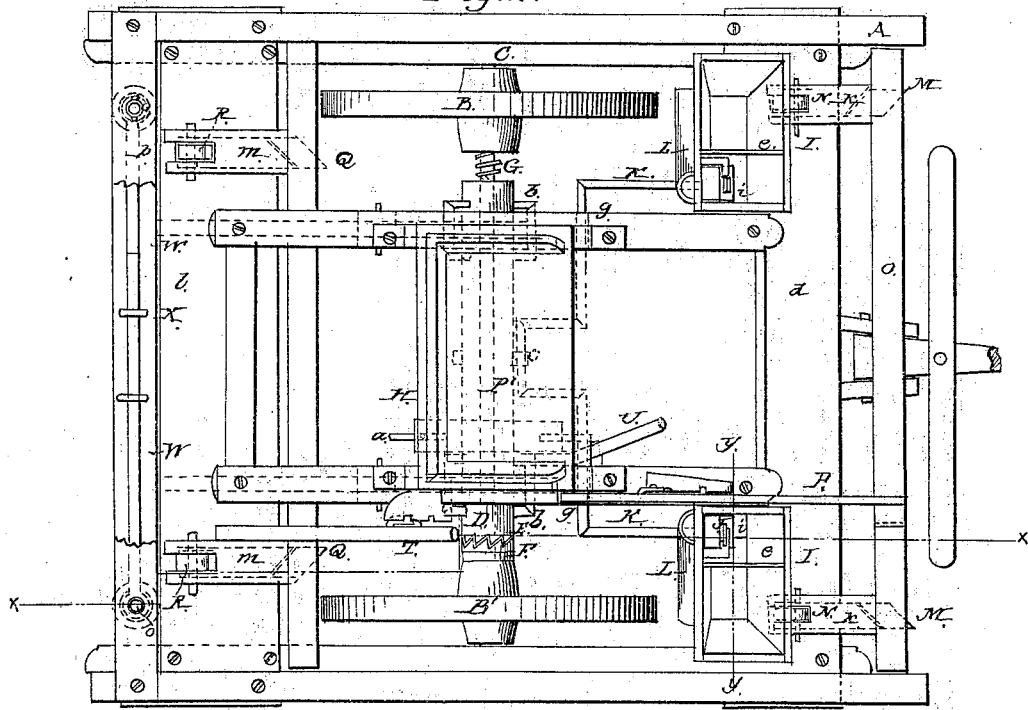
Figure 3:
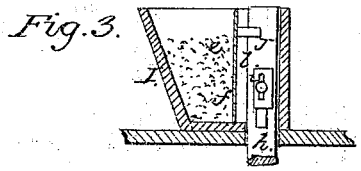

Figure 1 is a side sectional view of my invention, taken in the line $x\,x$, Fig. 2. Fig. 2 is a plan or top view of the same. Fig. 3 is a detached vertical section of a hopper, taken in the line $y\,y$, Fig. 2.

Similar letters of reference indicate corresponding parts in the several figures.

This invention relates to that class of seeding-machines which are designed for sowing seed in hills in check-rows, and has for its object the preventing of the choking of the seed-distributing device and the perfect control over the operation thereof, so as to insure the seed being dropped at suitable points.

The invention also has for its object the ready adjustment of the furrow and covering shares, as well as the proper compacting of the earth on the seed and the marking of the hills.

To enable those skilled in the art to fully understand and construct my invention, I will proceed to describe it.

A represents a rectangular frame, which is supported by two wheels, B B', which are placed loosely on their axle C, the latter being secured permanently in the frame A.

On the axle C, between the two wheels B B', there is placed loosely a cylinder, D, and this cylinder has a ratchet or clutch, E, on it at one end, which, when the machine is in operation, gears into a corresponding ratchet or clutch, F, on the hub of the wheel B', and the ratchet E is kept in gear with ratchet F by a spring, G, on the axle C, as will be fully understood by referring to Fig. 2.

On the cylinder D there is placed a wheel, H, provided with radial arms $a$, and tappets $b\,b\,c$ are also placed on or attached to said cylinder.

At the front part of the frame A there is placed a cross-bar, $d$, on which two hoppers, I I, are placed, one near each end. These hoppers are each divided by a vertical partition, $e$, the lower parts of the partitions having openings $f$ made in them—one in each—as shown clearly in Fig. 3. In the smaller compartment of each hopper I there is placed a slide, J. These slides extend down through the cross-bars $d$, and are connected at their lower parts to the end of a lever-frame, K, the fulcrum of which is at $g\,g$, as shown at Fig. 2. The back part of the lever-frame K extends within the path of rotation of the tappets $c$. Each slide J has a hole or seed-cell, $h$, made in it, and these cells are each provided with a slide or gage, $i$, by adjusting which the capacity of the seed-cells may be regulated as desired. This will be fully understood by referring to Figs. 1 and 3. In the back part of each hopper I, near its upper end, there is an opening, $j$, and these openings communicate with the upper ends of seed-tubes L L, which extend down behind the furrow-shares M M. The shares M M are attached to the lower ends of curved or segment bars N N, which pass up through the cross-bar $d$, and are secured at their upper ends to arms $k\,k$, which are attached to a shaft, O, the ends of which shaft are fitted loosely in the frame A, so that it may turn and admit of the shares N being raised and lowered. The shaft O has a lever, P, secured to it, which extends back within reach of the driver's seat P, and by actuating this lever the furrow-shares may be adjusted as desired.

Q Q are covering-shares, which are attached to the lower ends of curved or segment bars R R, which pass through a back bar, $l$, of the framing, and are connected at their upper ends to the arms $m\,m$ of a shaft, S, the ends of which are fitted loosely in the framing A. The shaft S has a lever, T, attached to it, and this lever extends forward within the reach of the driver on seat P. The arrangement of the covering-shares, as regards their adjustment, is precisely the same as that of the furrow-shares.

U is a lever, which is fitted in the framing A, and extends down by the side of wheel H on the cylinder D.

V V represent two stampers, which are formed of weights or pestles $n\,n$, attached to the lower ends of rods $o\,o$, said rods being fitted loosely in a bar, $p$, at the back part of the framing. The weights or pestles n n are in line with the wheels B B'. The rods o o rest on springs W W, which sustain the weights or pestles n n when the latter are not acted upon by any extraneous force. The springs W W are attached to a bar, X, which is connected to the outer ends of levers Y Y, which have their fulcra p' in pendants Z, attached to the framing. The front ends of the levers Y Y extend within reach of the tappets b b of the cylinder D.

The operation is as follows: As the machine is drawn along, the shares M M open the furrows, and the seed is distributed therein by the action of the slides J J, which are elevated in consequence of the tappets c on cylinder D striking the inner end of frame K, the slides falling by their own gravity as the tappets pass the frame. Each time the slides J reach their culminating point their seed-cells h, which are full of seed, are brought in register with with the holes j in the backs of the hoppers I, and said seed is discharged into the tubes L and deposited in the furrows made by the shares M. The seed is not forced or crowded into the cells h, that contingency being prevented by the partitions e of the hoppers I, which, by means of the openings f, supply the cells h about as required, the weight of superincumbent seed being thereby avoided. The seed is covered by the shares Q Q, and the hills are stamped so that the earth will be compacted on the seed by the descent of the stampers V, which are elevated by the action of the tappets b b on the levers Y Y, the stampers V dropping and acting upon the hills simultaneously with the planting or dropping of the seed in front. At any time when it is necessary to vary or modify the dropping of the seed, in order to insure its perfect dropping in check-rows, the cylinder D may be disengaged from the hub of the wheel B' by actuating lever U and throwing the ratchet E free from the ratchet F. The driver then, by reaching back, may turn the wheel H and cylinder D, and thereby regulate or control the dropping of the seed, as circumstances may require, to insure the planting of the seed in check-rows.

In moving the machine from place to place the shares M Q are elevated entirely above the surface of the ground, and the ratchets E F are thrown out of gear.

Having thus described my invention, what I claim as new, and desire to secure by Letters Patent, is—

The arrangement of the adjustable curved segment-bars or share-carriers N N, slides J, lever-frame K, spring-ratchet cylinder D, and tappet-wheel H with each other and with the tubes L, adjustable segment-bars or share-carriers R, springs W, and stampers V, the whole constructed and operating together, as and for the purpose herein shown and described.

A. C. STILES.

Witnesses:
S. A. TAYLOR,
B. H. TRIPP.